US007254672B1

(12) United States Patent
Murray et al.

(10) Patent No.: US 7,254,672 B1
(45) Date of Patent: Aug. 7, 2007

(54) TRANSLATION DEVICE DRIVER FOR TRANSLATING BETWEEN DISK DEVICE DRIVER AND TAPE DEVICE DRIVER COMMANDS

(75) Inventors: Thomas J. Murray, Longmont, CO (US); Stephen H. Blendermann, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 319 days.

(21) Appl. No.: 11/026,076

(22) Filed: Dec. 30, 2004

(51) Int. Cl.
G06F 12/00 (2006.01)
G06F 13/00 (2006.01)
G06F 13/28 (2006.01)

(52) U.S. Cl. .................................................. 711/112
(58) Field of Classification Search ................. 711/112
See application file for complete search history.

(56) References Cited

U.S. PATENT DOCUMENTS

| 4,549,234 | A |   | 10/1985 | Sakamoto ................. 360/10.2 |
| 4,947,367 | A | * | 8/1990  | Chang et al. ................. 710/65 |
| 5,297,124 | A | * | 3/1994  | Plotkin et al. ................ 360/49 |
| 5,485,321 | A |   | 1/1996  | Leonhardt et al. ............ 360/48 |
| 5,710,676 | A |   | 1/1998  | Fry et al. .................... 360/72.1 |
| 5,793,552 | A |   | 8/1998  | Howell ...................... 360/72.2 |
| 5,892,633 | A |   | 4/1999  | Ayres et al. ............. 360/73.08 |
| 5,923,494 | A |   | 7/1999  | Arisaka et al. .......... 360/78.02 |
| 5,959,800 | A |   | 9/1999  | Hartung et al. ............ 360/74.4 |
| 5,995,306 | A |   | 11/1999 | Contreras et al. ............. 360/31 |
| 6,031,671 | A |   | 2/2000  | Ayres ........................ 360/40 |
| 6,094,605 | A |   | 7/2000  | Blendermann et al. ..... 700/214 |
| 6,226,441 | B1 |  | 5/2001  | Hartung et al. ............... 386/46 |
| 6,674,599 | B1 |  | 1/2004  | Rae et al. .................. 360/72.1 |
| 6,937,411 | B2 |  | 8/2005  | Goodman et al. ............ 360/48 |
| 2004/0181388 | A1 | * | 9/2004 | Yip et al. ..................... 703/25 |

\* cited by examiner

Primary Examiner—Reginald Bragdon
Assistant Examiner—Aracelis Ruiz
(74) Attorney, Agent, or Firm—Brooks Kushman P.C.

(57) ABSTRACT

A translation device driver apparatus and method are disclosed. A first type of request is received from a disk-based file system to access a first type of storage device. The first type of storage device permits direct access reads and writes and implements update-in-place data modification wherein individual blocks of data stored in the first type of storage device can be modified individually without invalidating data stored in any other blocks in the first type of storage device. The first type of request is translated into a second type of request. The second type of request is a request for a second type of storage device. The second type of storage device operates in append-only mode. The second type of storage device does not permit update-in-place data modification. The second type of request is forwarded to a storage system. The storage system is designed to be the second type of storage device. The storage system is modified to permit update-in-place data modification.

20 Claims, 12 Drawing Sheets

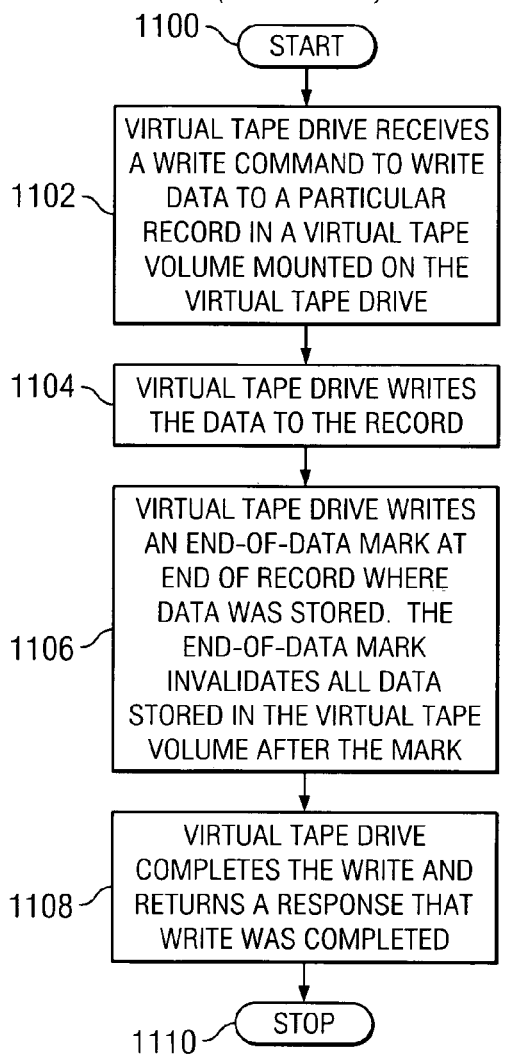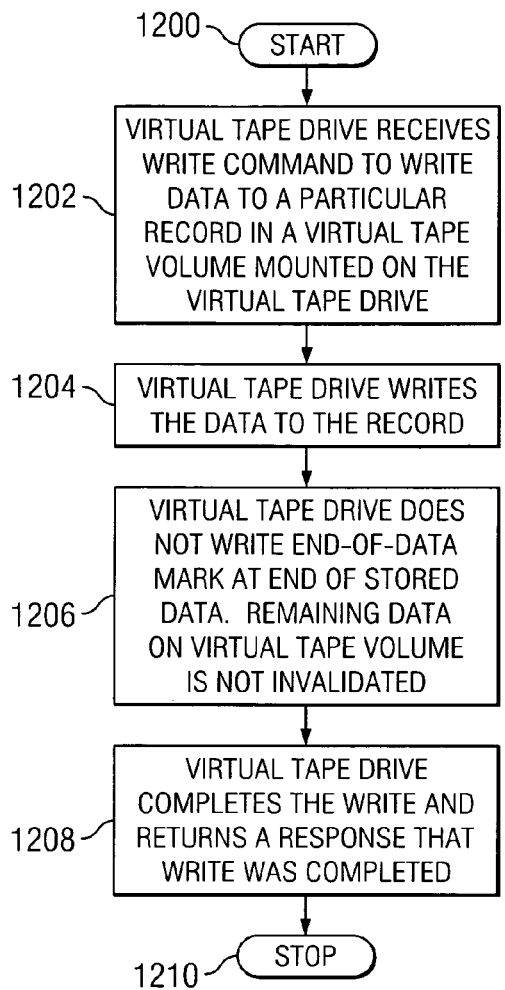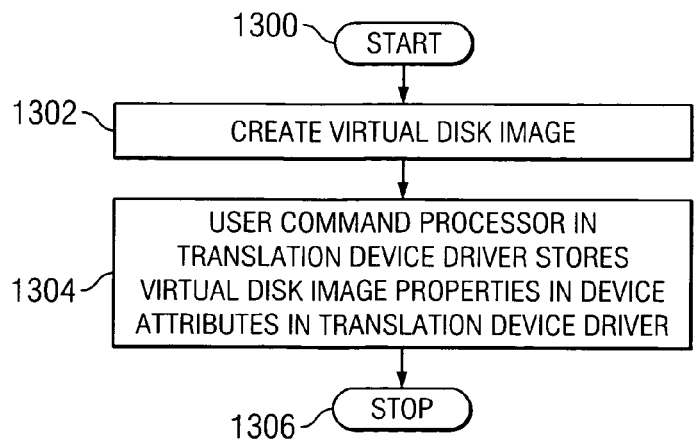

TRANSLATION DEVICE DRIVER FOR TRANSLATING BETWEEN DISK DEVICE DRIVER AND TAPE DEVICE DRIVER COMMANDS

CROSS-REFERENCE TO RELATED APPLICATION

The subject matter of the present invention is related to U.S. patent application Ser. No. 11/026,079, now Pat. No. 7,167,326, issued Jan. 23, 2007, entitled: "Tape Drive That Supports Update-In-Place", filed on even date herewith, assigned to the same assignee hereof, and which is incorporated herein by reference.

BACKGROUND OF THE INVENTION

1. Technical Field

The present invention relates generally to data processing systems and more particularly to storage devices and storage systems. Still more specifically, the present invention provides a translation device driver for translating between disk device driver commands and tape device driver commands in order to provide a block addressable virtual tape storage system that permits direct access and update-in-place access to its data.

2. Description of Related Art

Tapes store data sequentially from the beginning of the tape to the end of the tape. A computer system cannot modify data stored in the middle of the data stored on the tape. A tape drive is an append-only storage system. Thus, data can be appended to the end of the data currently stored on the tape. Data stored in the middle of the data on a tape can be modified, but in this case, all of the data stored after the modified data will be invalidated. Therefore, data cannot be modified in the middle the tape and have the data located after the modified data remain usable. When data is replaced in the middle of the tape, all data on the tape located after the replaced data is invalidated.

Conversely, a disk drive storage system allows data to be updated in place. Thus, in a disk drive system, a block on the disk can be modified without invalidating other data stored on the disk drive.

Applications may be written assuming that the storage media the application will be using will be a storage system that permits direct access reads and writes as well as update-in-place. Disk drive storage systems permit direct access reads and writes as well as update-in-place. When an application attempts to access a disk drive storage system, the application makes a call to a file system in order to translate logical disk locations to physical disk locations. The file system is used to convert a request to access data at a logical disk location into a request to access the actual physical disk location where the requested data is physically stored.

A file system is a data structure that includes the names of files as well as the information needed to locate and access these files. The file system can be accessed directly, or randomly, for read and write operations. Furthermore, the file system supports update-in-place operations for each one of its blocks such that a write operation intended to update or replace the content of any block does not affect the content of any other block in the data structure.

The backing storage for this data structure must be a virtual or physical block storage device that supports direct access, i.e. random access, read, write, and update-in-place operations. Disk storage devices support these backing storage requirements and are typically used as devices to store a file system.

While tape storage is directly, i.e. randomly, accessible for reading and writing, there are no virtual tape storage devices that support an update-in-place capability. Virtual tape systems are known in the art. These systems are designed to operate using the same update rules as those used by physical tape storage systems or devices. Physical tape storage systems or devices do not support update-in-place data modification. Thus, known virtual tape systems do not permit update-in-place data modification.

Tape storage devices are unsuitable for storing a file system. Physical tape devices do not support update-in-place because of the inherent physical limitations of magnetic tape recording technology. All of the virtual tape implementations preserve the features and limitations of the physical tape drives and thus do not support update-in-place capability.

An attempt to rewrite or update a virtual or physical tape record location beyond the updated or rewritten record is not permitted because the data located after the updated or rewritten record is invalid after the update. This violates the update-in-place requirement for a file system data structure.

FIG. 1 is a block diagram of a data processing system 100 that uses a disk-based file system 102 to access a disk drive 104 through a disk driver 106 in accordance with the prior art. Individual independent blocks of data are stored on disk drive 104. Each block can be accessed and/or modified independently from all of the other blocks that are stored on disk drive 104. Disk drive access requests are sent to disk driver 106 which then forwards them to disk drive 104.

For example, as depicted by FIG. 1, a write command has been issued to write data to block 2000, and a write command has been issued to write data to block 504. When the data is written into these blocks, only these blocks are modified. Thus, when data is written to block 2000, only block 2000 is modified. The remaining blocks of data on disk drive 104 remain valid and unchanged.

In addition, FIG. 1 also illustrates a read command that has been issued to read data from block 77, a read command that has been issued to read data from block 241, and a read command that has been issued to read data from block 19.

Data can be read from and written to individual blocks in disk drive 104 without affecting the other blocks. For example, when the data in block 156 is modified, the remaining blocks are not affected. They remain valid regardless of where these blocks are located with respect to each other in disk drive 104.

FIG. 2 is a block diagram of a data processing system 200 that includes a tape application 202 that accesses a tape drive 204 through a tape driver 206 in accordance with the prior art.

Tape application 202 issues requests to access tape drive 204 first to tape driver 206 which then forwards the requests to tape drive 204. Data is stored in records on tape media 208 that is included within tape drive 204. When a particular record is to be accessed, tape media 208 must first be physically positioned to that record. When a record is to be read, tape media 208 is wound and rewound until that record is reached on tape media 208. The data can then be read from the record and transmitted from tape drive 204 back to tape driver 206.

Additional data can be stored in tape drive 204 by appending additional records to the end of the data that is already stored on tape media 208. Existing data that is already stored on tape media 208 can also be modified.

When existing data is to be modified, tape media 208 is wound and rewound until the record that includes that data is reached on tape media 208. The new data can then be written to that record. In this case, all of the data that is stored on the tape after the modified record is invalidated.

For example, FIG. 2 illustrates reading a record, such as record 54, from tape media 208. When a record, such as record 54, is read, the data on tape media 208 is not affected. It remains valid. When a record, such as new record 58 is appended to the end of the existing records, the existing records are not affected. They remain valid. If, however, an existing record, such as record 55, is modified, the remaining records that are located after the modified record are invalidated. In this case, if record 55 is modified, records 56-58 are invalidated.

A file system generates a read/write command in a disk drive based format. Because the file system assumes that it is accessing a disk drive, the read/write commands are in a disk drive format. These commands are then transmitted to the disk driver as described above which then forwards the commands to the disk drive. When a tape application issues read/write commands, those commands are in a tape drive based format since the tape application assumes that it is accessing a tape drive. Thus, it is not known to replace a disk drive system with a tape drive system such that a file system is able to issue disk drive based commands that are used to access a tape drive system that is capable of processing only tape drive based commands.

Therefore, a need exists for a method and system that provides a translation device driver for translating between disk device driver commands and tape device driver commands in order to provide a block addressable virtual tape storage system that permits direct access and update-in-place access to its data.

SUMMARY OF THE INVENTION

A translation device driver apparatus and method are disclosed. A first type of request is received from a disk-based file system to access a first type of storage device. The first type of storage device permits direct access reads and writes and implements update-in-place data modification wherein individual blocks of data stored in the first type of storage device can be modified individually without invalidating data stored in any other blocks in the first type of storage device. The first type of request is translated into a second type of request. The second type of request is a request for a second type of storage device. The second type of storage device operates in append-only mode. The second type of storage device does not permit update-in-place data modification. The second type of request is forwarded to a storage system. The storage system is designed to be the second type of storage device. The storage system is modified to permit update-in-place data modification.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 11 illustrates a high level flow chart that depicts a tape drive that invalidates all data stored after modified data in accordance with the prior art;

FIG. 12 depicts a high level flow chart that illustrates a virtual tape drive that permits update-in-place modification of data stored on the virtual tape drive in accordance with the present invention;

FIG. 13 illustrates a high level flow chart that depicts storing device attributes within a translation device driver in accordance with the present invention;

DETAILED DESCRIPTION OF THE PREFERRED EMBODIMENTS

Figure 1:
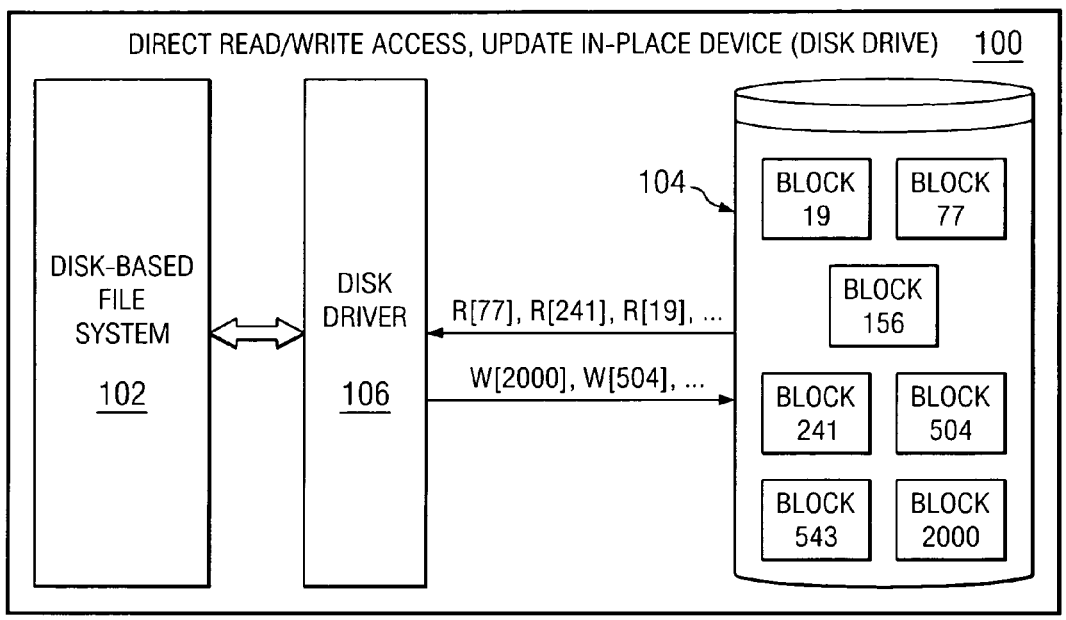
FIG. 1 is a block diagram of a data processing system that uses a disk-based file system to access a disk drive through a disk driver in accordance with the prior art.

A preferred embodiment of the present invention and its advantages are better understood by referring to the figures, like numerals being used for like and corresponding parts of the accompanying figures.

The present invention is a method and apparatus for translating between disk device driver commands and tape device driver commands in order to provide a block addressable virtual tape storage system that permits direct access for reads/writes and permits update-in-place access to its data. A translation device driver is provided that receives requests that are in a disk drive format. These requests are generated by a process or device, such as a file system, that believes it is accessing a block addressable storage device such as a disk drive. Thus, these requests specify a particular disk drive and particular block within the disk drive to be accessed. These requests are in a disk drive format.

The virtual tape system is designed to receive and process tape drive access requests. These tape drive access requests are in a tape drive format. The translation device driver receives the disk drive requests, translates the requests into a tape drive format, and then forwards the requests to a virtual tape system.

In addition to translating between a disk drive format and a tape drive format, the translation device driver translates the requested disk drive and block locations included within the disk drive request into a particular virtual tape drive and a record location within the virtual tape volume that is mounted on that virtual tape drive. Thus, the translation device driver maps disk drive locations that are requested by the file system to virtual tape volume locations where the data is actually stored.

The translation device driver also generates tape drive commands that are necessary to properly position a tape volume mounted on a tape drive to access a particular tape record. Prior to processing a tape drive access request to access a particular tape record, a tape volume mounted on a tape drive must be positioned to that particular tape record. Thus, because the virtual tape system operates in a manner that is similar to a physical tape drive, the virtual tape system must also be manipulated in order to position a virtual tape volume mounted on a particular virtual tape drive, to a particular tape record location. After the virtual tape volume is properly positioned, the particular record on the virtual tape volume can be accessed.

After receiving the disk drive request and translating the disk drive location into a virtual tape volume location, the translation device driver issues a command to position the virtual tape volume mounted on a virtual tape drive to the particular tape record location. The translation device driver then generates a tape drive command that is in a tape drive format to access the particular record within the particular virtual tape volume.

The virtual tape system generates a response to the access of the virtual tape volume. This response is in a tape drive format. The virtual tape system then transmits this response to the translation device driver. The translation device driver then translates the response back to a disk drive format. The translation device driver may include an indication in the response of the particular disk drive and block within the disk drive that was requested to be accessed.

Thus, the translation device driver converts requests and responses between a disk drive format and a tape drive format. In addition, the translation device driver converts between disk addresses and tape addresses so that the proper address is included in a request or a response. The translation device driver also generates any tape drive commands that are necessary to execute an access request, e.g. LOCATE commands.

In addition to the features described above, the present invention permits a virtual tape system that is designed to operate in append-only mode to operate in an update-in-place mode. The virtual tape system has been modified according to the present invention so that when data within the virtual tape system is modified, the remaining data in the system is not invalidated. Thus, the modified virtual tape system permits update-in-place modification to its data.

The translation device driver provides a user command processor and device attributes storage so that the translation device driver can also process control operation commands. The requests described above are read or write requests to read or write to a particular disk drive location. In addition to read and write requests, it may be necessary to execute other types of disk drive commands. A user may at some time wish to access a disk drive to execute commands other than reads or writes. These other commands are referred to herein as control operation commands. For example, these commands may include commands to format a disk drive or retrieve the disk drive's partition table.

The translation device driver only presents virtual disk images to disk applications such as a file system. A particular virtual disk image is created by configuring the translation device driver to represent the particular virtual disk image. A virtual disk image is realized within the translation device driver as a set of stored device attributes that represent the properties of the virtual disk image. The translation device driver stores virtual disk configuration information in device attributes storage maintained within the driver when the virtual disk image is created. These device attributes are then used to respond to control operation commands to access the virtual disk image.

Figure 3:
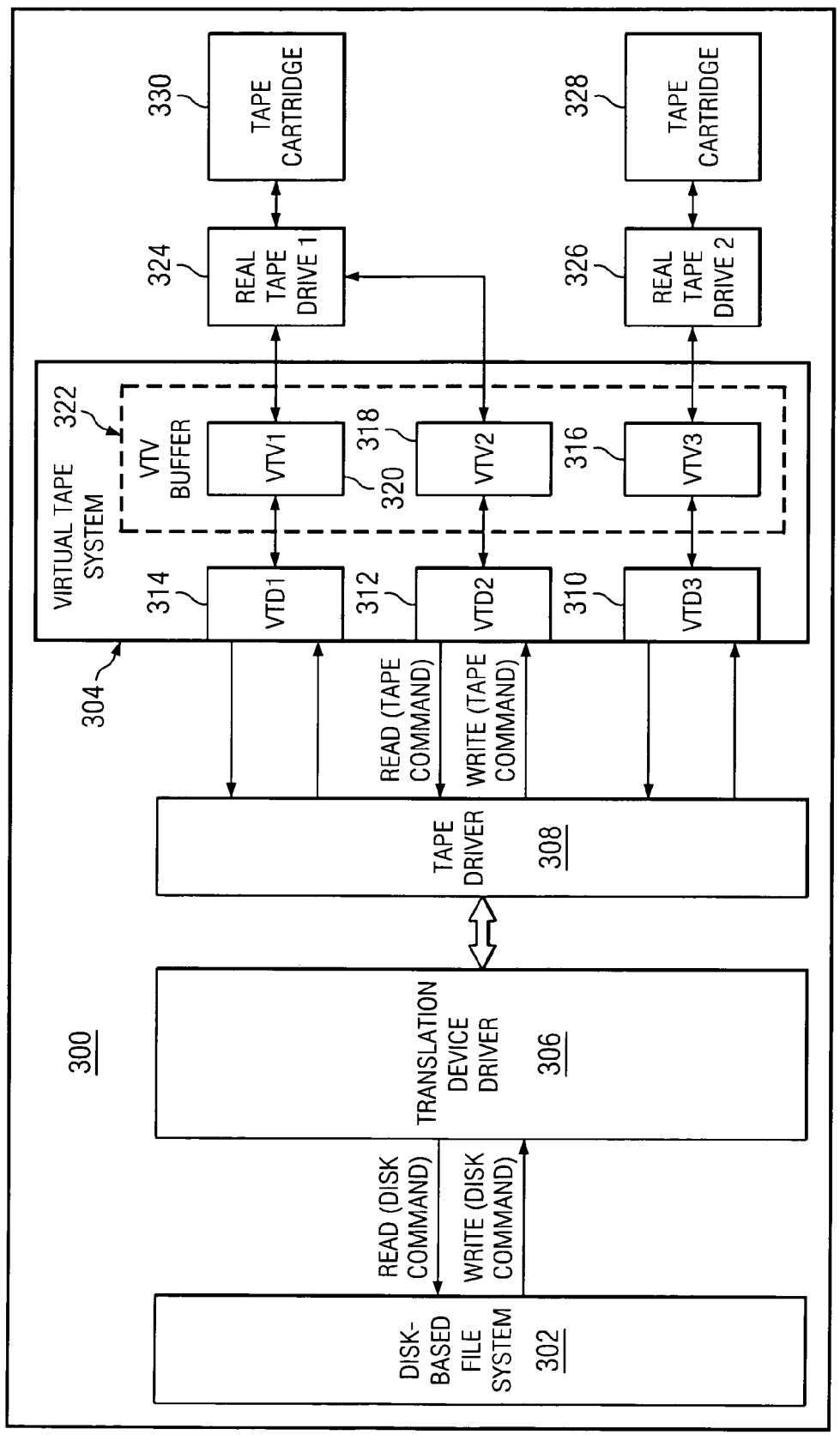
FIG. 3 is a block diagram of a data processing system that uses a disk-based file system to access a virtual tape system through a translation device driver in accordance with the present invention.

FIG. 3 is a block diagram of a data processing system 300 that uses disk-based file system 302 to access a virtual tape system 304 through a translation device driver 306 in accordance with the present invention.

Translation device driver 306 receives read and write requests from disk-based file system 302. These read and write requests are in a disk-based format that is used when accessing a disk drive. Translation device driver 306 receives these requests, translates the requests into a tape-based format, and then forwards the tape-based requests to tape driver 308. Tape driver 308, then, forwards the requests to virtual tape system 304.

Virtual tape system 304 includes a plurality of different virtual tape drives (VTDs), such as VTD 310, VTD 312, and VTD 314. Each virtual tape drive is associated with one or more virtual tape volumes (VTVs). For example, VTD 310 is associated with VTV 316. VTD 312 is associated with VTV 318. And, VTD 314 is associated with VTV 320.

All of the virtual tape volumes are a part of a virtual tape buffer 322. According to an important feature of the present invention, virtual tape buffer 322 is implemented in a physical disk drive. Thus, when data is read from or written to a virtual tape volume within a virtual tape drive, that data is actually physically stored on a physical disk drive.

Virtual tape system 304 is associated with one or more physical tape drives such as real tape drive 324 and real tape drive 326. Data that is stored in a virtual tape volume may be further backed up by moving that data to a tape cartridge that is inserted into the VTV's associated physical tape drive. For example, virtual tape volume 316 is associated with tape cartridge 328. Data that is stored within VTV 316 may be moved to cartridge 328 that can be inserted into real tape drive 326. Virtual tape volumes 318 and 320 are associated with tape cartridge 330. Data that is stored within either VTV 318 or VTV 320 may be moved to cartridge 330 that can be inserted into real tape drive 324.

Figure 4:
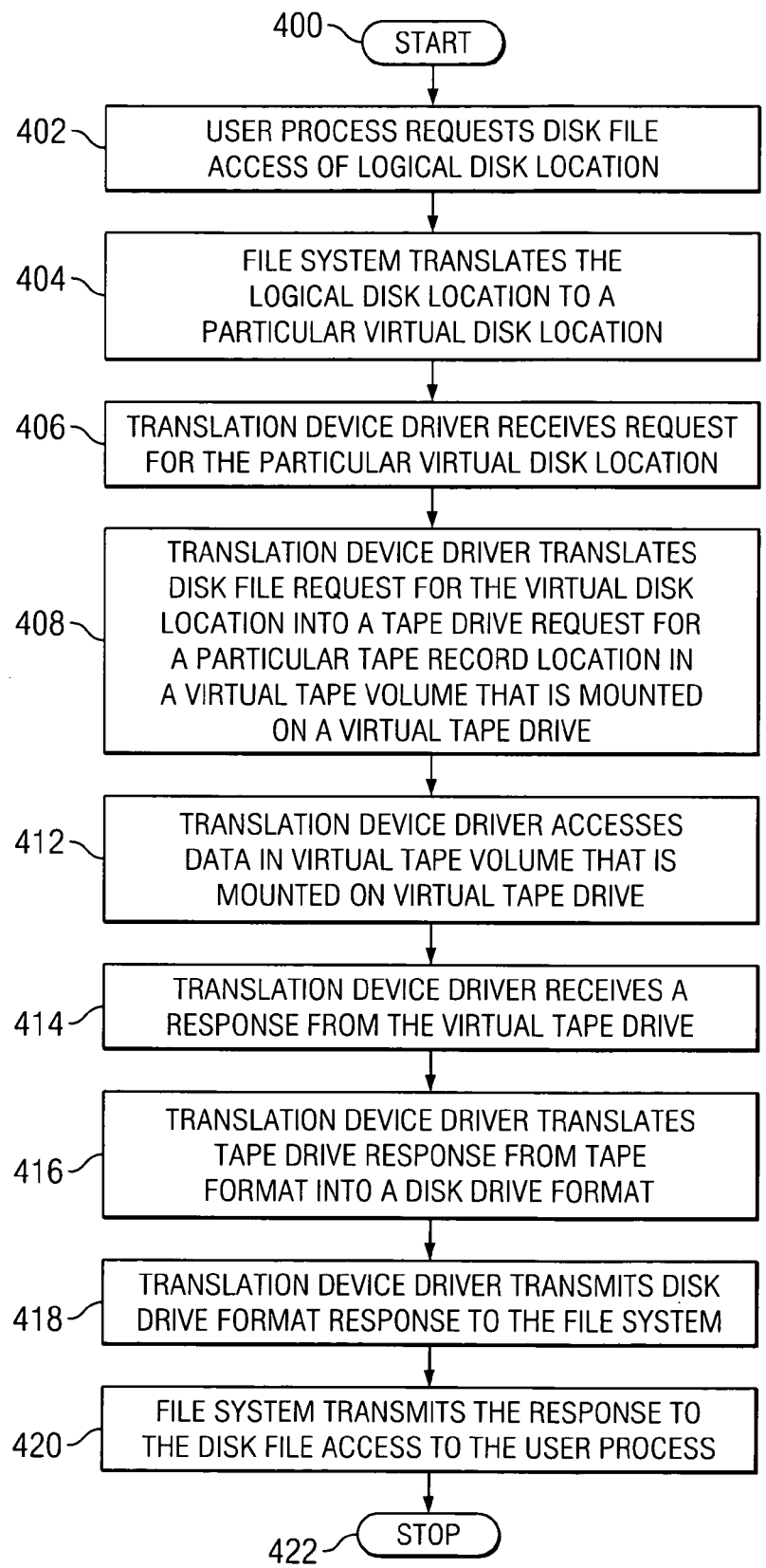
FIG. 4 depicts a high level flow chart that illustrates the overall process of the present invention that utilizes a disk-based device driver to access a virtual tape drive in accordance with the present invention.

FIG. 4 depicts a high level flow chart that illustrates the overall process of the present invention that utilizes a disk-based device driver to access a virtual tape drive in accordance with the present invention. The process starts as depicted by block 400 and thereafter passes to block 402 which illustrates a process that is in the user space requesting disk file access of a logical disk location. This may be a request by the user process to read a logical disk location or a request to write to a logical disk location.

The process then passes to block 404 which depicts the file system receiving the request and translating the logical disk location to a particular virtual disk location. Next, block 406 illustrates a translation device driver receiving the request for the particular virtual disk location. Block 408, then, depicts the translation device driver translating the disk file request for the virtual disk location into a tape drive request for a particular tape location. The particular tape location is a particular tape record location in a particular virtual tape volume. This particular virtual tape volume is associated with a particular virtual tape drive. At this time, the virtual tape volume is logically mounted on its associated particular virtual tape drive.

Thereafter, block 412 illustrates the translation device driver accessing data in the virtual tape volume that is mounted on the virtual tape drive. The process then passes to block 414 which depicts the translation device driver receiving, from the virtual tape drive, a response to the access of the virtual tape volume. Next, block 416 illustrates the translation device driver translating the virtual tape drive's response from a tape format into a disk drive format. Block 418, then, depicts the translation device driver transmitting this response that is in the disk drive format to the file system. Thereafter, block 420 illustrates the file system transmitting a response to the disk file access to the user process. The process then terminates as depicted by block 422.

Figure 5:
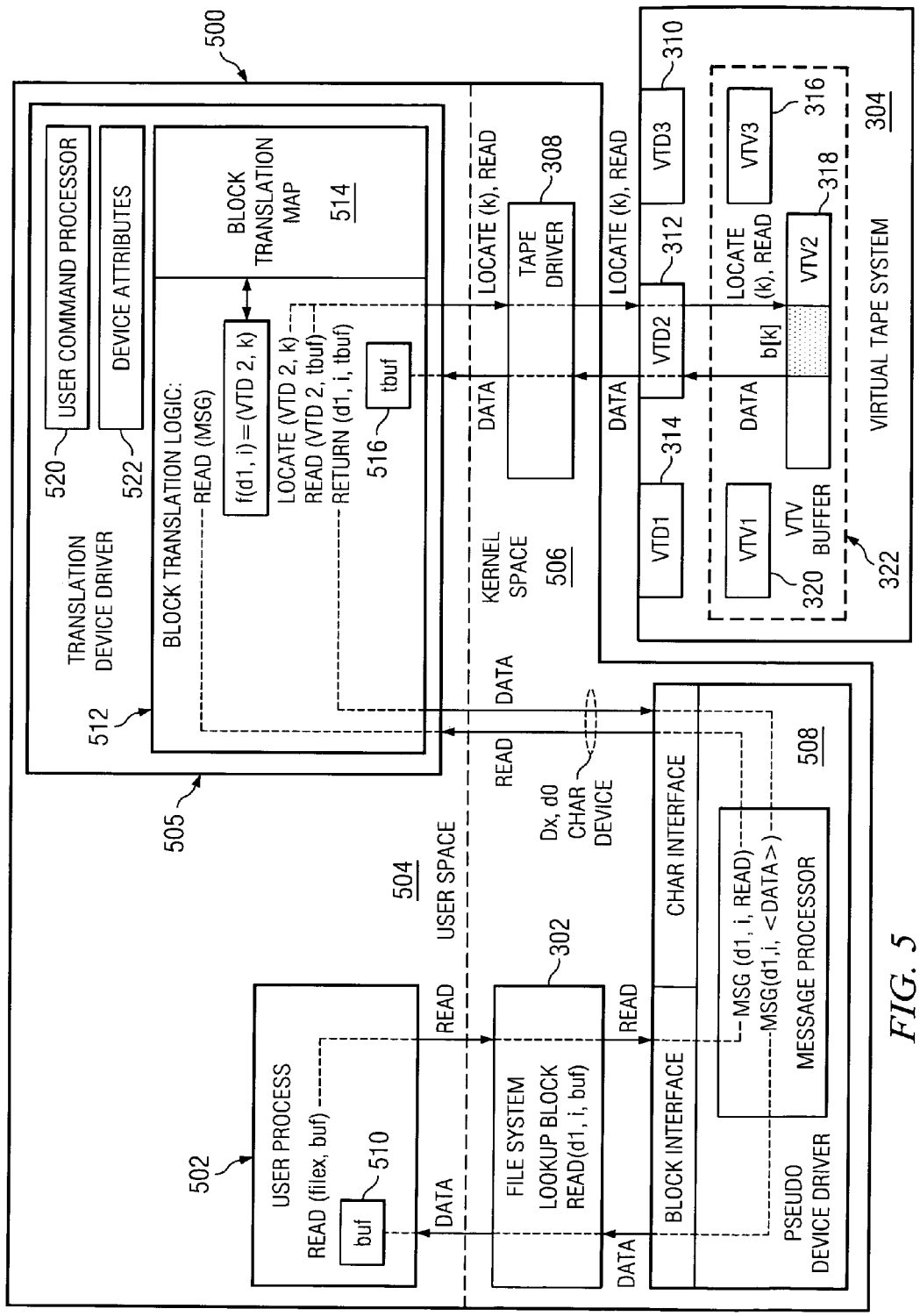
FIG. 5 is a block diagram of a first embodiment in accordance with the present invention.

FIG. 5 is a block diagram of a first embodiment 500 in accordance with the present invention. The first embodiment is implemented within a computer system 500, such as the computer system depicted by FIG. 15. The present invention is implemented as a "user space" process according to the first embodiment. Computer system 500 executes an operating system that includes a kernel. The kernel is responsible for managing the lower level operations of computer system 500. For example, the kernel is responsible for managing memory accesses, files, and communications with hardware components such as peripherals.

The kernel is also responsible for communicating with software applications that are executing on top of the operating system. The kernel executes in "kernel space" while the software and user applications execute in "user space". As depicted by FIG. 5, a user application 502, also called a process, is executing in user space 504. Translation device driver 505 is also executing in user space 504. File system 302 is located in kernel space 506. Pseudo device driver 508 and tape driver 308 are both executing in kernel space 506.

Requests that are transmitted and executed in user space 504 are expected in a particular format. Requests that are transmitted and executed in kernel space 506 are expected in a different particular format. Because translation device driver 505 is executing in user space 504 in the embodiment depicted by FIG. 5, pseudo device driver 508 is provided in kernel space 506 to repackage requests between user space 504 and kernel space 506.

Translation device driver 505 includes block translation logic 512, block translation map 514, a user command processor 520, and device attributes 522.

User command processor 520 is used to receive and process commands from a human operator. User command processor 520 is used to create a virtual disk image as an element of translation device driver 505. User command processor 520 also manipulates a defined virtual disk image using the information that is stored in device attributes 522.

Information describing the attributes of a virtual disk image is stored in device attributes 522 when a virtual disk image is created and configured. This information describes the configuration of a particular virtual disk image as an element of the translation device driver 505. This configuration data includes the volume serial number(s) of the formatted virtual tape volume(s) that comprise the backing storage for the virtual disk, the number of formatted records on each virtual tape volume, the virtual disk label, the virtual disk block size, the virtual disk partition table, and other attributes completing the virtual disk description.

Before a process or an application such as file system 302 can access a newly created virtual disk image, a human operator must format the complete set of virtual tape volumes assigned to this virtual disk image using techniques known in the art. Each virtual tape volume must be formatted as a series of consecutive fixed-length records. The length of each record must equal the block size defined for the virtual disk image. Formatting, which is performed only once when creating a virtual disk, establishes block-addressable record locations on the virtual tape volumes. The human operator must then use command processor 520 to ready the virtual disk for use by a process or application such as file system 302. For a particular virtual disk image, user command processor 520 will mount the corresponding virtual tape volume(s) on virtual tape drive(s) in the virtual tape system 304. Also for a particular virtual disk image, user command processor 520 will update block translation map 514 to denote the associations between the virtual disk, the virtual tape volume(s) comprising that virtual disk, and the virtual tape drives upon which those virtual tape volumes are mounted. Once these steps are completed, processes and applications such as file system 302 can access the virtual disk.

Processes and applications, such as file system 302, access and manipulate a virtual disk image exactly as if it were a physical disk. A process or the file system 302 needs to access a virtual disk image at times to perform functions other than reading and writing data to the virtual disk image. For example, a FORMAT command may be issued to format a virtual disk image. At other times, a process or the file system 302 needs to determine how much total storage a virtual disk image can provide. A process or the file system 302 may need to obtain the partition table of a virtual disk image. These types of commands are control operation commands that are not read/write commands. Translation device driver 505 processes control operation commands using the information stored in device attributes 522. The processing of read/write commands are described in more detail below.

User process 502 generates a request to read a logical disk file location, i.e. "filex", and put the data that is read from that location into a buffer "buf" 510 within user process 502. This request is transmitted to file system 302 which then translates the logical disk file location, filex, to a virtual disk file location, e.g., "d1, i". This virtual disk location indicates a virtual disk "d1" and a block "i" within that disk. A new request to read d1, i and put the results in buffer "buf" is then transmitted from file system 302 to pseudo device driver 508. This new request is in a kernel space format.

Pseudo device driver 508 then repackages the new request from a kernel space format into a message in a user space format to read d1,i and put the results in buffer "buf". This user space message is then transmitted from pseudo device driver 508 to translation device driver 505.

Translation device driver 505 receives this message within block translation logic 512. The message includes the indication of virtual disk drive and block number as parameters.

Block translation logic 512 executes a translation function "f". This translation function is a process that accesses a block translation map 514. Block translation map 514 is prestaged when virtual tape volumes are mounted on particular virtual tape drives for a particular virtual disk. Block translation map 514 maintains a map between virtual disk drives and virtual tape volumes. The association between virtual tape volume(s) that are used to represent a particular virtual disk drive is kept in block translation map 514 for each virtual disk drive.

When a particular virtual tape volume is mounted on a particular virtual tape drive, an association between that particular VTV and the particular VTD is established in block translation map 514. Therefore, when a particular virtual tape volume is identified, it is known which virtual tape drive is associated with that virtual tape volume.

Translation function "f" executes with the parameters that are passed to it. In this case the parameters are "d1,i". Translation function "f" accesses block translation map 514 and device attributes 522 to determine which VTV, and thus which VTD, corresponds to virtual disk drive "d1", and which block within that VTV corresponds to block "i".

In the example depicted by FIG. 5, virtual tape drive 2 (VTD2) 312 corresponds to virtual disk drive d1, and block "k" within VTV2 318 corresponds to block "i" within disk drive d1. Block translation logic 512 then generates a tape drive LOCATE command which is transmitted to tape driver 308 which forwards the command to VTD2 312. This LOCATE command will cause VTD2 312 to position the virtual tape media VTV2 318 to block k. Block translation logic 512 then issues a tape drive READ command to read the data that is stored at the location where the virtual tape volume is positioned in VTD2 312, i.e. block k. This READ command includes a location "tbuf" where the data that is read from VTV2 318 is to be stored. The location "tbuf" is a buffer 516 within block translation logic 512.

Block translation logic 512 then returns to pseudo device driver 508 the data that is stored in tbuf 516 for virtual disk drive location "d1,i". This data is in a user space 504 format and is transmitted to pseudo device driver 508. Pseudo device driver 508 repackages this data into a kernel space 506 format. This data that is now in a kernel space format is transmitted to file system 302. File system 302 then sends the data to user process 502 to be stored in buffer 510.

Figure 6:
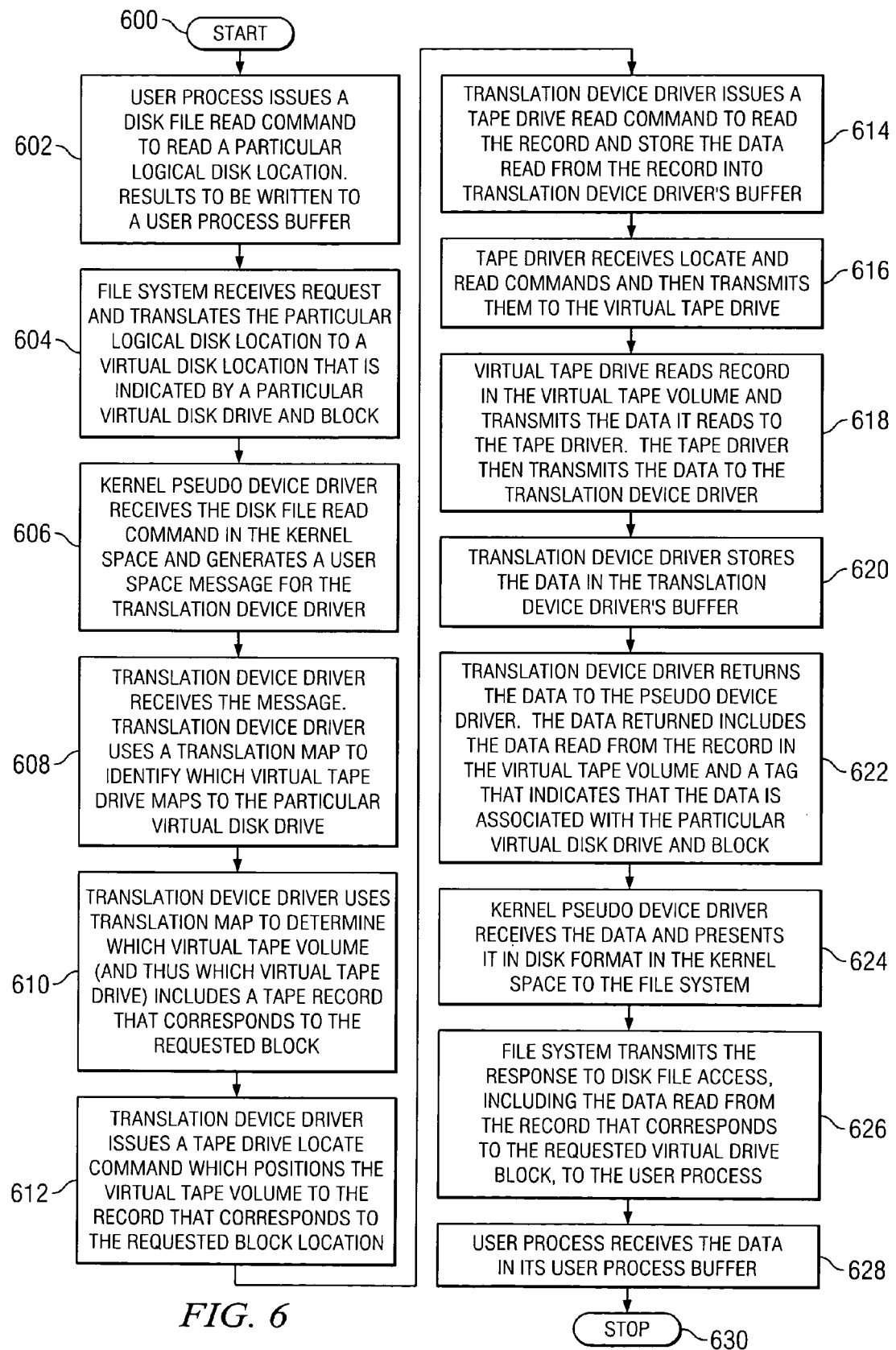
FIG. 6 depicts a high level flow chart that illustrates using a disk-based device driver to read data from a virtual tape drive in accordance with a first embodiment, depicted by FIG. 5, in accordance with the present invention.

FIG. 6 depicts a high level flow chart that illustrates using a disk-based device driver to read data from a virtual tape volume in accordance with a first embodiment, depicted by FIG. 5, in accordance with the present invention. The process starts as depicted by block 600 and thereafter passes to block 602 which illustrates the user process issuing a disk file read command to read a particular logical disk location. The command indicates that the data that is read is to be stored in a buffer within the user process.

The process then passes to block 604 which depicts the file system receiving the request and translating the particular logical disk location to a virtual disk location. The virtual disk location is represented in the disk file read command as a particular disk drive and a particular block number within that disk drive. Next, block 606 illustrates the kernel pseudo device driver receiving, within the kernel space, the disk file read command and generating a message, in the user space format, for the translation device driver.

Thereafter, block 608 depicts the translation device driver receiving this message within the user space. The translation device driver then accesses a translation map to identify which virtual tape drive maps to that particular virtual disk drive. Block 610, then, depicts the translation device driver determining which virtual tape volume, and thus which virtual tape drive, includes a record that corresponds to the requested disk block.

The process passes to block 612 which illustrates the translation device driver issuing a tape drive LOCATE command which positions the virtual tape volume to the record in the volume that corresponds to the requested block location. Next, block 614 depicts the translation device driver issuing a tape drive READ command to read the record and store the data read from the record into a buffer within the translation device driver. Thereafter, block 616 illustrates a tape driver receiving the tape drive LOCATE and READ commands and then transmitting them to the virtual tape drive.

Then, block 618 depicts the virtual tape drive reading the record in the virtual tape volume and transmitting the data it reads to the tape driver. The tape driver then transmits this data to the translation device driver. Next, block 620 illustrates the translation device driver storing the data in the translation device driver's buffer. Thereafter, block 622 depicts the translation device driver returning the data to the pseudo device driver. The data returned contains the data read from the record in the virtual tape volume and a tag that indicates that the data is associated with the particular virtual disk drive and block.

Block 624, then, depicts the kernel pseudo device driver receiving, in the kernel space, the data returned from the translation device driver. The kernel pseudo device driver then generates a response in the disk format that includes the data and indicates the particular virtual disk drive and block. This disk drive response is then presented, in the kernel space, to the file system.

The process then passes to block 626 which illustrates the file system transmitting the response to the disk file access, including the data read from the virtual tape volume record that corresponds to the requested virtual disk drive block, to the user process. Thereafter, block 628 depicts the user process receiving the data in its buffer. The process then terminates as illustrated by block 630.

Figure 7:
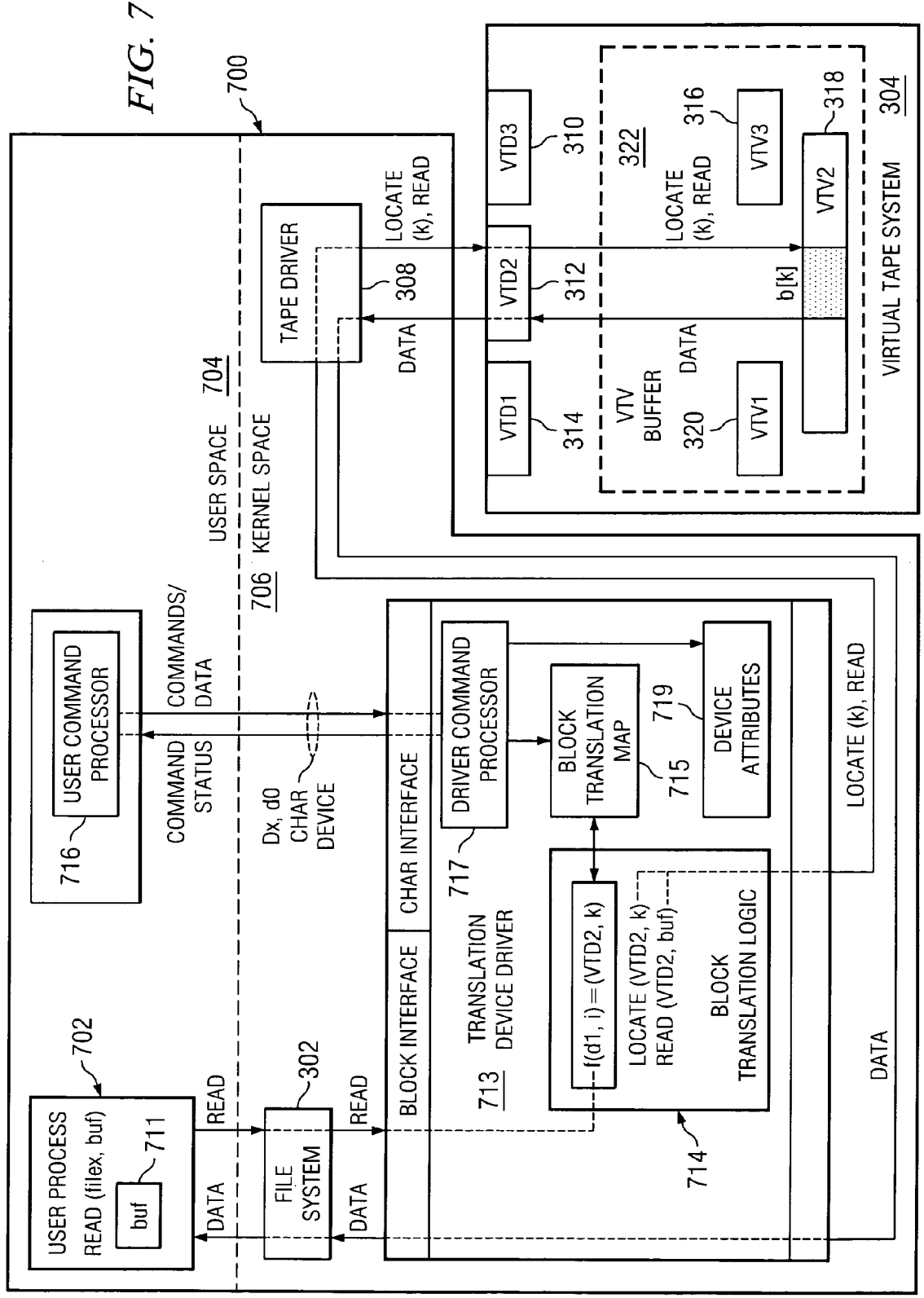
FIG. 7 is a block diagram of a second embodiment in accordance with the present invention.

FIG. 7 is a block diagram of a second embodiment 700 in accordance with the present invention. The second embodiment is implemented within a computer system 700, such as the computer system depicted by FIG. 15. The present invention is implemented as a "kernel space" process according to the second embodiment. Computer system 700 executes an operating system that includes a kernel. The kernel is responsible for managing the lower level operations of computer system 700. For example, the kernel is responsible for managing memory accesses, files, and communications with hardware components such as peripherals. As depicted by FIG. 7, a user application 702, also called a process, is executing in user space 704. Translation device driver 713 is executing in kernel space 706. File system 302 and tape driver 308 are also located in kernel space 706.

Translation device driver 713 includes block translation logic 714, block translation map, 715, driver command processor 717, and device attributes 719.

User command processor 716 is used to receive and process commands from a human operator. Its purpose is identical to user command processor 520 as described in the embodiment depicted by FIG. 5. User command processor 716 is used to create a virtual disk image as an element of translation device driver 713. User command processor 716 also manipulates a defined virtual disk image using the information that is stored in device attributes 719.

Information describing the attributes of a virtual disk image is stored in device attributes 719 when a virtual disk image is created and configured. This information describes the configuration of a virtual disk image as an element of the translation device driver 713.

User command processor 716, which executes in user space 704, exchanges commands, data and status with driver command processor 717, which executes in kernel space 706. Driver command processor 717 updates block translation map 715 and device attributes 719 as directed by user command processor 716. Driver command processor 717 also returns data and status to user command processor 716 in response to requests from user command processor 716.

User process 702 generates a request to read a logical disk file location, i.e. "filex", and put the data that is read from that location into a buffer "buf" 711 within user process 702. This request is transmitted to file system 302 which then translates the logical disk file location, filex, to a virtual disk file location, e.g., "d1, i". This virtual disk location indicates a virtual disk "d1" and a block "i" within that disk. A new request to read d1, i and put the results in buffer "buf" is then transmitted from file system 302 to translation device driver 713. Translation device driver 713 receives this request within block translation logic 714. The request includes the virtual disk drive and block as parameters.

Block translation logic 714 executes a translation function "f". This translation function is a process that accesses a block translation map 715. Block translation map 715 is prestaged when virtual tape volumes are mounted on particular virtual tape drive for a particular virtual disk. Block translation map 715 maintains a map between virtual disk drives and virtual tape volumes.

Translation function "f" executes with the parameters that are passed to it. In this case the parameters are "d1,i". Translation function "f" accesses block translation map 715 and device attributes 719 to determine which VTV, and thus which VTD, corresponds to virtual disk drive "d1", and which block within that VTV corresponds to block "i".

In the example depicted by FIG. 7, virtual tape drive 2 (VTD2) 312 corresponds to virtual disk drive d1, and block "k" within VTV2 318 corresponds to block "i" within disk drive d1. Block translation logic 714 then generates a tape drive LOCATE command which is transmitted to tape driver 308 which forwards the command to VTD2 312. This LOCATE command will cause VTD2 312 to position the virtual tape media VTV2 318 to block k. Block translation logic 714 then issues a tape drive READ command to read the data that is stored at the location where the virtual tape volume is positioned in VTD2 312, i.e. block k.

Block translation logic 714 then receives the data back from tape driver 308 that was read from block k within VTV2 318. Translation device driver 713 then generates a response, in a disk drive format, that includes the data that was read from VTV2 318. This response is in the disk drive format expected by file system 302. This response is then transmitted to file system 302. File system 302 then sends the data to user process 702 to be stored in buffer 711.

Figure 8:
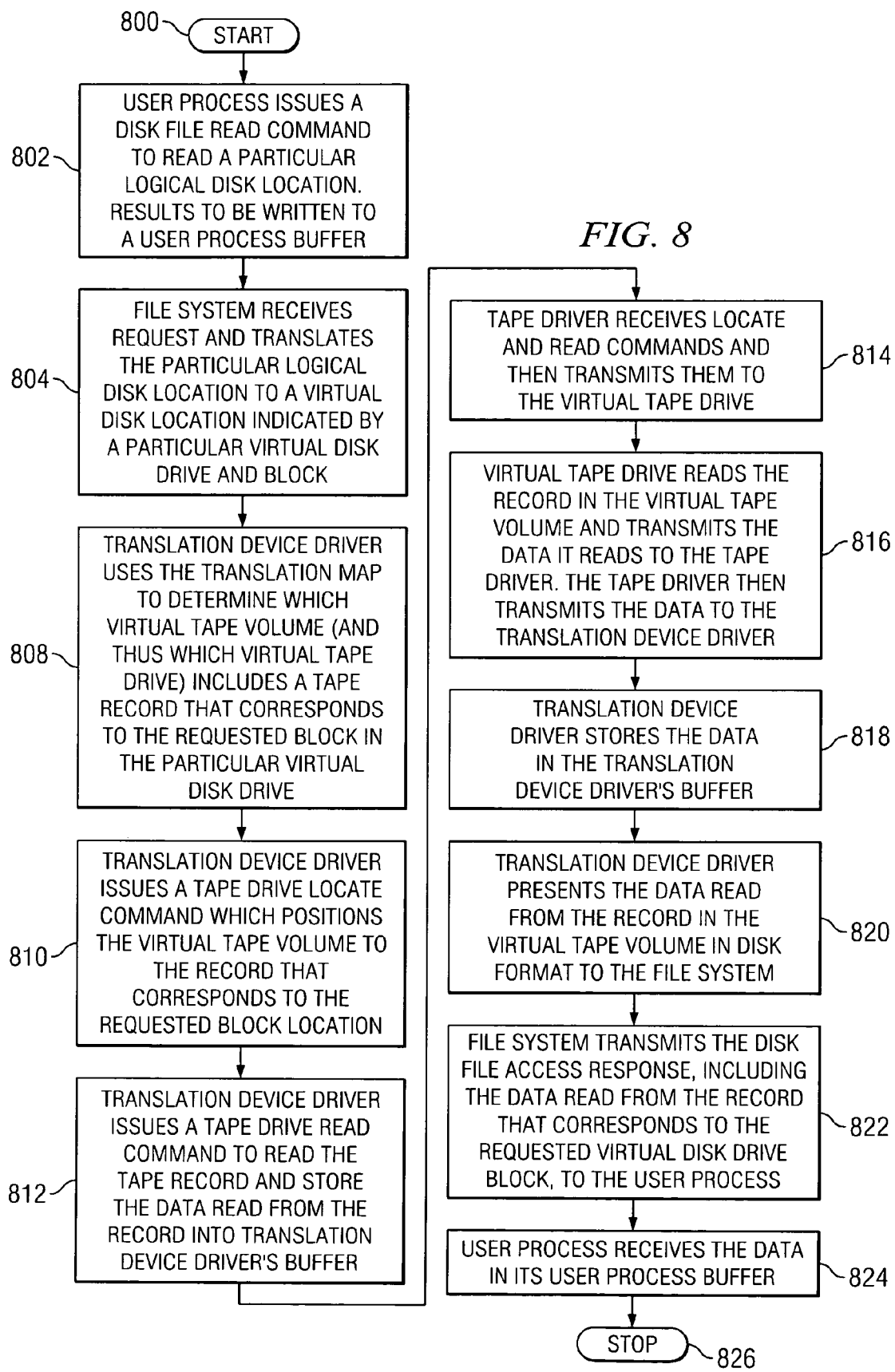
FIG. 8 illustrates a high level flow chart that depicts using a disk-based file system to read data from a virtual tape drive in accordance with a second embodiment, depicted by FIG. 7, in accordance with the present invention.

FIG. 8 illustrates a high level flow chart that depicts using a disk-based device driver to read data from a virtual tape volume in accordance with a second embodiment, depicted by FIG. 7, in accordance with the present invention. The process starts as depicted by block 800 and thereafter passes to block 802 which illustrates the user process issuing a disk file read command to read a particular logical disk location. The command indicates that the data that is read is to be stored in a particular buffer within the user process.

The process then passes to block 804 which depicts the file system receiving the request and translating the particular logical disk location to a virtual disk location. The virtual disk location indicates a particular virtual disk drive and buffer. Then, block 808 depicts the translation device driver determining which virtual tape volume, and thus which virtual drive, includes a tape record that corresponds to the requested block in the particular virtual disk drive. Thereafter, block 810 illustrates the translation device driver issuing a tape drive LOCATE command which positions the virtual tape volume to the record that corresponds to the requested block location.

The process then passes to block 812 which depicts the translation device driver issuing a tape drive READ command to read the tape record and then store the data read from this record into a buffer within the translation device driver. Thereafter, block 814 illustrates the tape driver receiving the LOCATE and READ commands and then transmitting them to the virtual tape drive. Block 816, then, depicts the virtual tape drive reading the record in the virtual tape volume and transmitting the data read from the virtual tape drive to the tape driver. The tape driver then transmits the data to the translation device driver. Next, block 818 illustrates the translation device driver storing the data in a buffer within the translation device driver. The process then passes to block 820 which depicts the translation device driver presenting the data, read from the record in the virtual tape volume, in disk format to the file system. Thereafter, block 822 illustrates the file system transmitting the disk file access response, including the data read from the record that corresponds to the requested virtual disk drive block, to the user process. Thereafter, block 824 depicts the user process receiving the data in its buffer. The process then terminates as illustrated by block 826.

Figure 9:
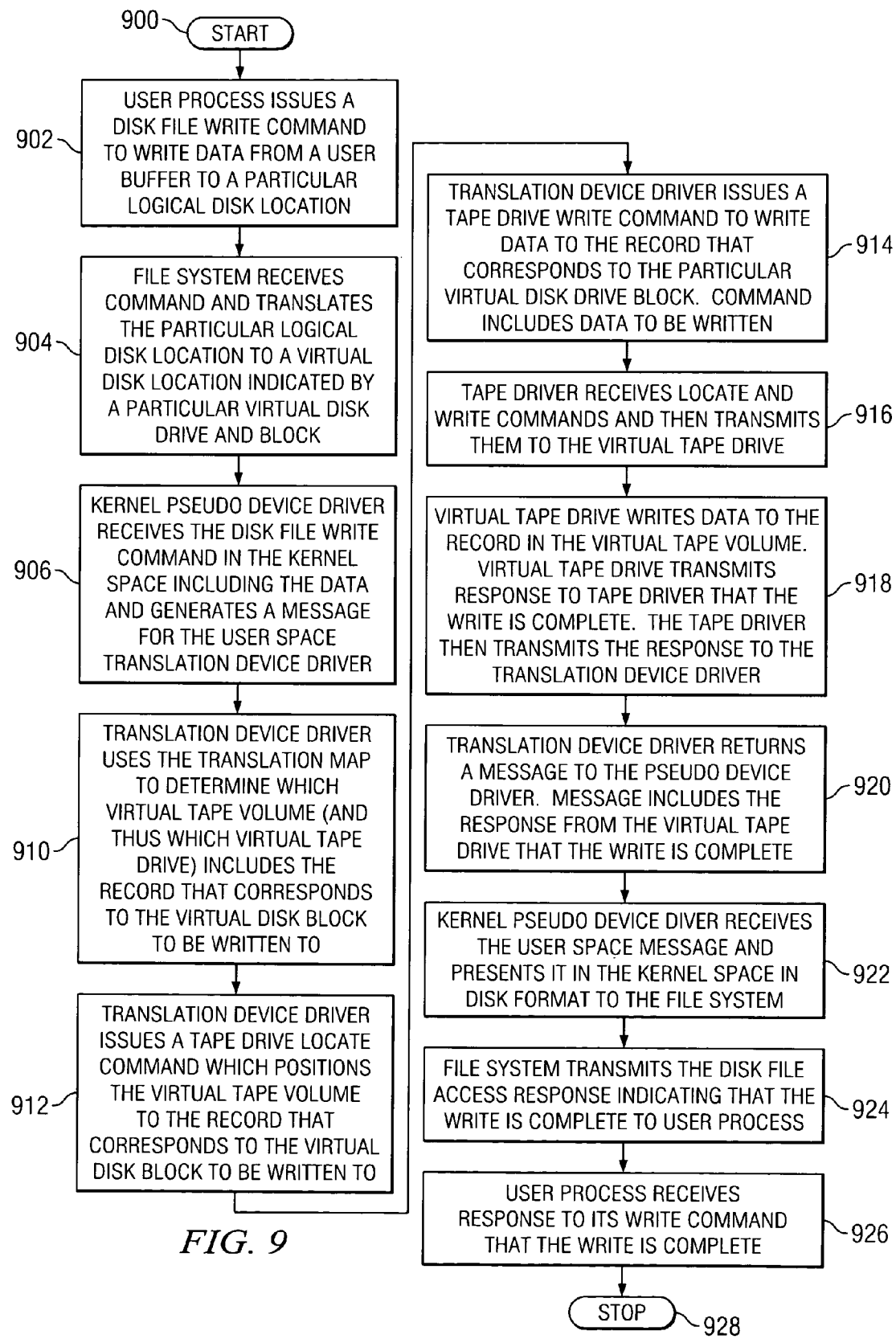
FIG. 9 depicts a high level flow chart that illustrates using a disk-based file system to write data to a virtual tape drive in accordance with a first embodiment, depicted by FIG. 5, in accordance with the present invention.

FIG. 9 depicts a high level flow chart that illustrates using a disk-based device driver to write data to a virtual tape volume in accordance with a first embodiment, depicted by FIG. 5, in accordance with the present invention. The process starts as depicted by block 900 and thereafter passes to block 902 which illustrates a user process issuing a disk file write command to write data from a user buffer to a particular logical disk location. Next, block 904 depicts the file system receiving the command and translating the particular logical disk location to a particular virtual disk location indicated by a particular virtual disk drive and block.

The process then passes to block 906 which illustrates the kernel pseudo device driver receiving, in the kernel space, the disk file write command. The disk file write command includes the data to be written. The kernel pseudo device driver generates a message for the translation device driver that is located in the user space.

Thereafter, block 910 illustrates the translation device driver determining which virtual tape volume, and thus which virtual tape drive, includes a record that corresponds to the virtual disk block to be written to. Block 912, then, depicts the translation device driver issuing a tape drive LOCATE command which positions that virtual tape volume to the record that corresponds to the virtual disk block to be written to. The process then passes to block 914 which illustrates the translation device driver issuing a tape drive WRITE command to write data to the record that corresponds to the virtual disk drive block. The command includes the data to be written to the virtual disk drive block.

Then, block 916 depicts the tape driver receiving the LOCATE and WRITE commands and then transmitting them to the virtual tape drive. Next, block 918 illustrates the virtual tape drive writing the data to the record in the virtual tape volume. The virtual tape drive transmits a response to the tape driver that the write is complete. The tape driver then transmits the response to the translation device driver.

Next, block 920 depicts the translation device driver returning a message to the pseudo device driver. The message includes the response from the virtual tape drive that the write is complete. Thereafter, block 922 illustrates the kernel pseudo device driver receiving, in the kernel space, the message and presenting it, in the kernel space, in a disk format to the file system. The process then passes to block 924 which depicts the file system transmitting the disk file access response that indicates that the write is complete. Next, block 926 illustrates the user process receiving the response to its WRITE command that the write is complete. The process then terminates as depicted by block 928.

Figure 10:
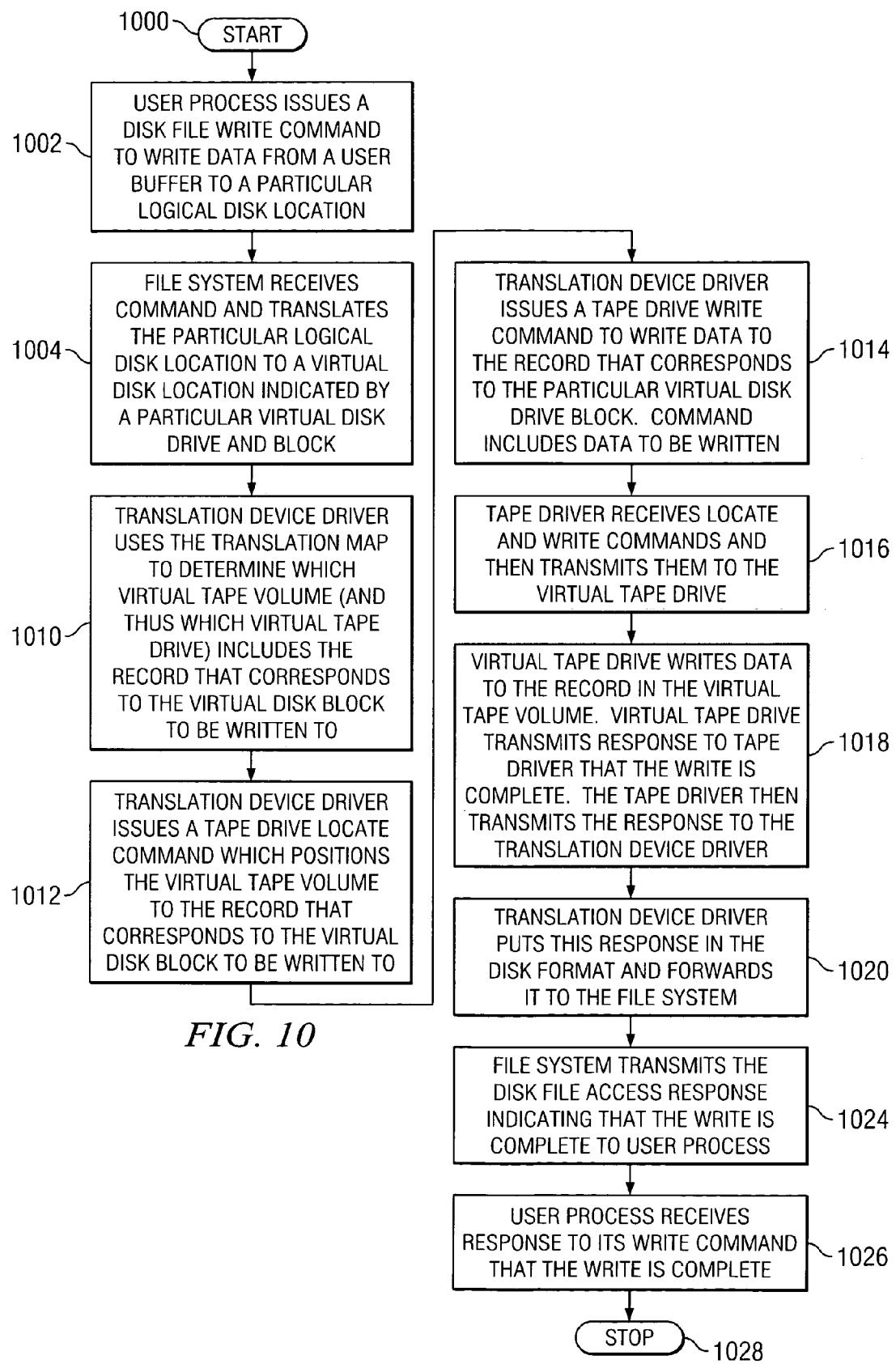
FIG. 10 illustrates a high level flow chart that depicts using a disk-based file system to write data to a virtual tape drive in accordance with a second embodiment, depicted by FIG. 7, in accordance with the present invention.

FIG. 10 illustrates a high level flow chart that depicts using a disk-based file system to write data to a virtual tape volume in accordance with a second embodiment, depicted by FIG. 7, in accordance with the present invention. The process starts as depicted by block 1000 and thereafter passes to block 1002 which illustrates a user process issuing a disk file write command to write data from a user buffer to a particular logical disk location. Next, block 1004 depicts the file system receiving the command and translating the particular logical disk location to a particular virtual disk location indicated by a particular virtual disk drive and block.

Thereafter, block 1010 illustrates the translation device driver determining which virtual tape volume, and thus which virtual tape drive, includes a record that corresponds to the virtual disk block to be written to. Block 1012, then, depicts the translation device driver issuing a tape drive LOCATE command which positions that virtual tape volume to the record that corresponds to the virtual disk block to be written to. The process then passes to block 1014 which illustrates the translation device driver issuing a tape drive WRITE command to write data to the record that corresponds to the virtual disk drive block. The command includes the data to be written to the virtual disk drive block.

Then, block 1016 depicts the tape driver receiving the LOCATE and WRITE commands and then transmitting them to the virtual tape drive. Next, block 1018 illustrates the virtual tape drive writing the data to the record in the virtual tape volume. The virtual tape drive transmits a response to the tape driver that the write is complete. The tape driver then transmits the response to the translation device driver.

Next, block 1020 depicts the translation device driver receiving the response and putting the response in a disk drive format. The disk drive format response is then transmitted to the file system. The process then passes to block 1024 which depicts the file system transmitting the disk file access response that indicates that the write is complete. Next, block 1026 illustrates the user process receiving the response to its WRITE command that the write is complete. The process then terminates as depicted by block 1028.

FIG. 11 illustrates a high level flow chart that depicts a tape drive operating in append-only mode for modification of data stored on the tape drive in accordance with the prior art. The process starts as depicted by block 1100 and thereafter passes to block 1102 which illustrates a virtual tape drive receiving a WRITE command to write to a particular record in the virtual tape volume mounted on the virtual tape drive. Next, block 1104 depicts the virtual tape drive writing data to the record. The process then passes to block 1106 which illustrates the virtual tape drive writing an end-of-data mark at the end of the record where the data was stored. The end-of-data mark invalidates all data that is stored in the virtual tape volume after the end-of-data mark. Block 1108, then, depicts the virtual tape drive completing the write command and returning a response that the write was completed. The process then terminates as illustrated by block 1110.

FIG. 12 depicts a high level flow chart that illustrates a tape drive that permits update-in-place modification of data stored on the tape drive in accordance with the present invention. The process starts as depicted by block 1200 and thereafter passes to block 1202 which illustrates a virtual tape drive receiving a WRITE command to write to a particular record in the virtual tape volume in the virtual tape drive. Next, block 1204 depicts the virtual tape drive writing data to the record. The process then passes to block 1206 which illustrates the virtual tape drive not writing an end-of-data mark at the end of the record where the data was stored. According to the present invention, no end-of-data mark is written when data is written to a virtual tape drive. Block 1208, then, depicts the virtual tape drive completing the write command and returning a response that the write was completed. The process then terminates as illustrated by block 1210.

FIG. 13 illustrates a high level flow chart that depicts storing device attributes within a translation device driver in accordance with the present invention. The process starts as depicted by block 1300 and thereafter passes to block 1302 which illustrates creating a virtual disk image. This virtual disk image is created when the translation device driver is configured to represent the particular virtual disk image. Next, block 1304 depicts accessing a user command processor in the translation device driver to store properties of the virtual disk image in the device attributes storage in the translation device driver. The process then terminates as illustrated by block 1306.

Figure 14:
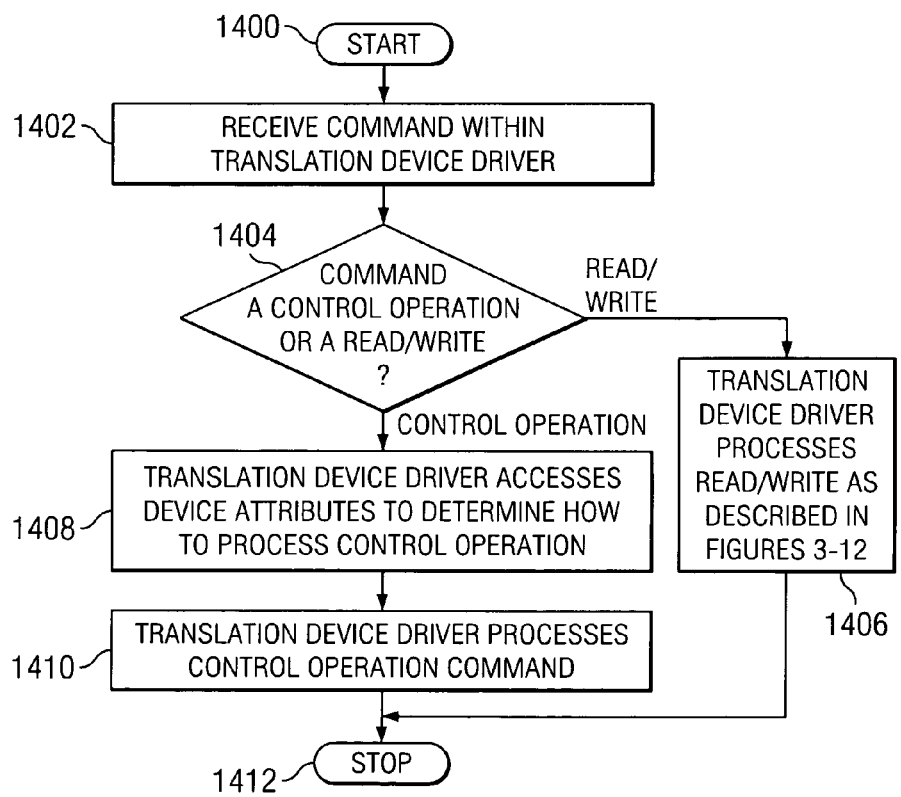
FIG. 14 depicts a high level flow chart that illustrates receiving commands and processing control operation commands using device attributes stored in a translation device driver in accordance with the present invention.
Figure 2:
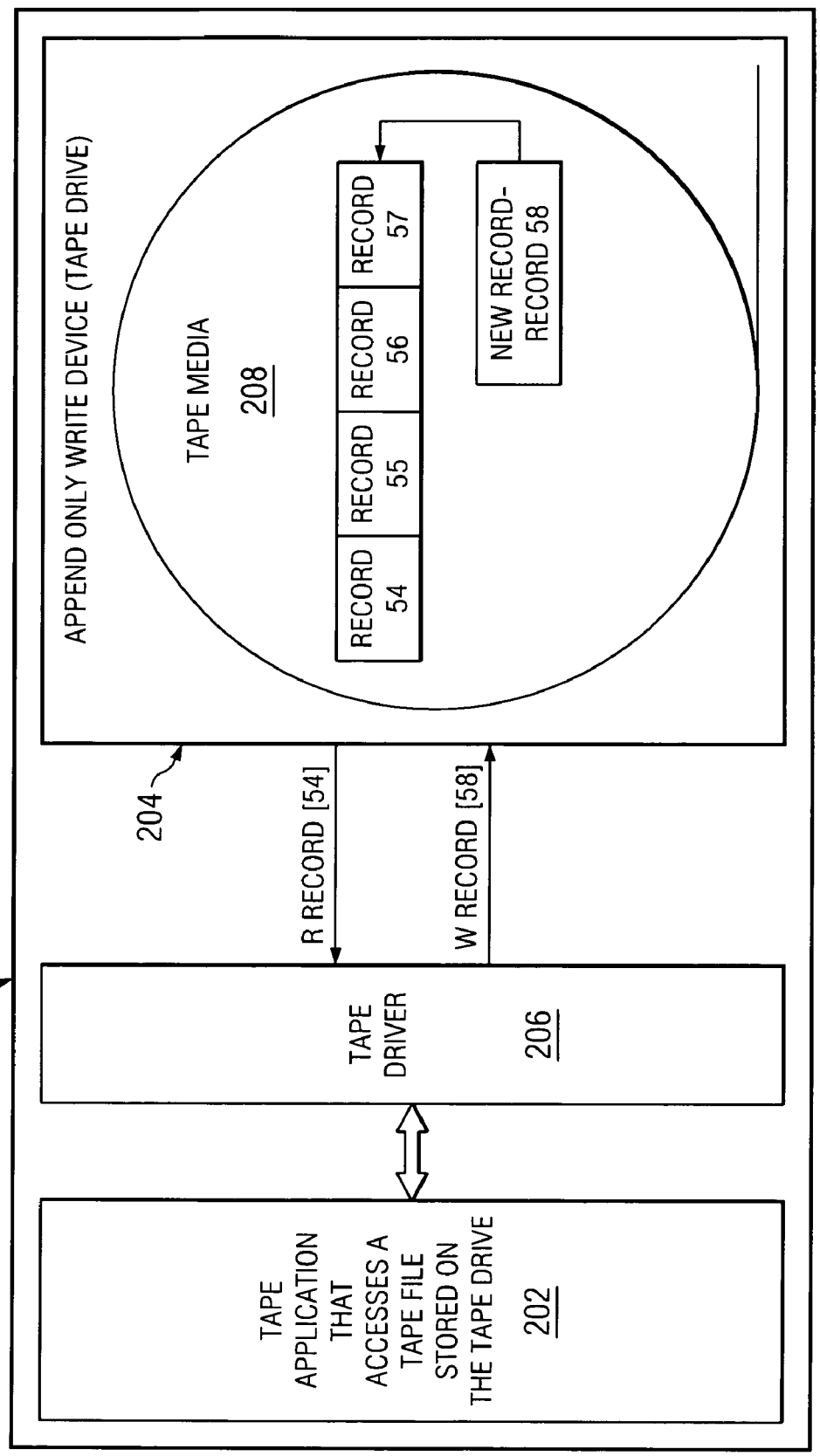
FIG. 2 is a block diagram of a data processing system that includes a tape application that accesses a tape drive through a tape driver in accordance with the prior art.

FIG. 14 depicts a high level flow chart that illustrates receiving commands and processing control operation commands using device attributes stored in a translation device driver in accordance with the present invention. The process starts as depicted by block 1400 and thereafter passes to block 1402 which illustrates receiving a command within the translation device driver. Next, block 1404 depicts a determination of whether or not the command is a control operation command or a command to either read or write. If a determination is made that the command is a read/write command, the process passes to block 1406 which illustrates the translation device driver processing the read/write command as described above with reference to FIGS. 3-12. The process then terminates as depicted by block 1412.

Referring again to block 1404, if a determination is made that the command is a control operation command, the process passes to block 1408 which depicts the translation device driver accessing device attributes to determine how to process the control operation command. Next, block 1410 illustrates the translation device driver processing the control operation command using the device attributes included within the translation device driver. The process then terminates as depicted by block 1412.

Figure 15:
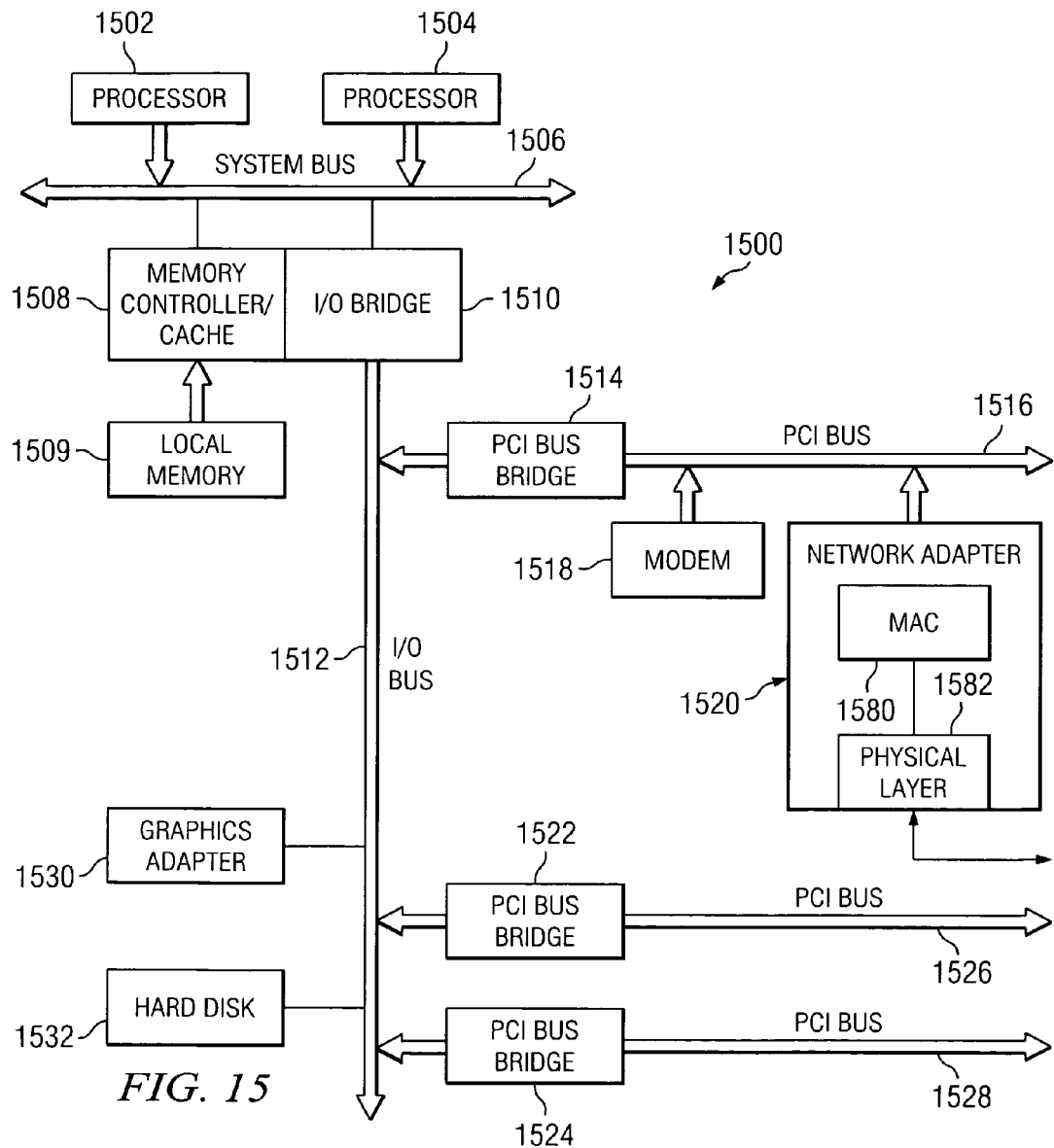
FIG. 15 is a block diagram of a computer system that may include the present invention in accordance with the present invention.

FIG. 15 is a block diagram of a data processing system that may include the present invention in accordance with the present invention. Data processing system 1500 may be a symmetric multiprocessor (SMP) system including a plurality of processors 1502 and 1504 connected to system bus 1506. Alternatively, a single processor system may be employed. Also connected to system bus 1506 is memory controller/cache 1508, which provides an interface to local memory 1509. I/O bus bridge 1510 is connected to system bus 1506 and provides an interface to I/O bus 1512. Memory controller/cache 1508 and I/O bus bridge 1510 may be integrated as depicted.

Peripheral component interconnect (PCI) bus bridge 1514 connected to I/O bus 1512 provides an interface to PCI local bus 1516. A number of modems may be connected to PCI bus 1516. Typical PCI bus implementations will support four PCI expansion slots or add-in connectors. Communications links to other network computers may be provided through modem 1518 and network adapter 1520 connected to PCI local bus 1516 through add-in boards.

Additional PCI bus bridges 1522 and 1524 provide interfaces for additional PCI buses 1526 and 1528, from which additional modems or network adapters may be supported. In this manner, data processing system 1500 allows connections to multiple network computers. A memory-mapped graphics adapter 1530 and hard disk 1532 may also be connected to I/O bus 1512 as depicted, either directly or indirectly.

Those of ordinary skill in the art will appreciate that the hardware depicted in FIG. 15 may vary and could indeed be a mainframe architecture rather than the depicted architecture. In addition, other peripheral devices, such as optical disk drives and the like, also may be used in addition to or in place of the hardware depicted. The depicted example is not meant to imply architectural limitations with respect to the present invention.

It is important to note that the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system, said method comprising:
receiving a first type of request from a disk-based file system to access a first type of storage device that permits direct access reads and writes and implements update-in-place data modification wherein individual blocks of data stored in said first type of storage device can be modified individually without invalidating data stored in any other blocks in said first type of storage device;
translating said first type of request into a second type of request, said second type of request being a request for a second type of storage device;
said second type of storage device operating in append-only mode, said second type of storage device not permitting update-in-place data modification;
forwarding said second type of request to a storage system, said storage system being designed to be said second type of storage device; and
modifying said storage system to permit update-in-place data modification.

2. The method according to claim 1, further comprising:
forwarding said second type of request to said storage system, said storage system being a virtual tape system.

3. The method according to claim 2, further comprising:
said virtual tape system including at least one virtual tape volume; and
storing said at least one virtual tape volume on a physical disk drive.

4. The method according to claim 1, further comprising:
said second type of storage device operating in append-only mode by storing an end-of-data mark after data in said second type of storage device that has been modified, said end-of-data mark invalidating all data that is stored after said modified data; and
modifying said storage system to permit update-in-place data modification by prohibiting said storage system from storing an end-of-data mark after data in said storage system that has been modified.

5. The method according to claim 1, further comprising:
receiving, within a translation device driver, said first type of request, said first type of request being a disk drive type of request to access a disk drive; and
translating, by said translation device driver, said first type of request into said second type of request, said second type of request being a request to access a tape drive.

6. The method according to claim 1, further comprising:
said storage system being a virtual tape system;
receiving, within a translation device driver, said first type of request, said first type of request being a disk drive type of request to access a particular virtual block within a particular virtual disk drive, said first type of request being in a disk drive format;
accessing, by said translation device driver, a translation map and device attributes; and
translating, by said translation device driver utilizing said translation map and said device attributes, said particular virtual block and said particular virtual disk drive into a particular virtual tape drive and a particular virtual tape volume and a particular record within said particular virtual tape volume.

7. The method according to claim 6, further comprising:
issuing, by said translation device driver, a tape drive locate command to said particular virtual tape drive; and
executing, by said virtual tape drive, said tape drive locate command to position said particular virtual tape volume that is associated with said particular virtual tape drive and said particular record.

8. The method according to claim 7, further comprising:
issuing, by said translation device driver, a tape drive access command to said particular virtual tape drive to access said particular record;

executing, by said virtual tape drive, said tape drive access command by accessing said record; and transmitting a response to said access from said particular virtual tape drive to said translation device driver, said response being in a tape drive format.

9. The method according to claim 8, further comprising:

receiving, within said translation device driver, said response;

converting said response from said tape drive format to said disk drive format;

transmitting said response in said disk drive format.

10. The method according to claim 1, further comprising:

said second type of storage device operating in append-only mode by storing an end-of-data mark after data in said second type of storage device that has been modified, said end-of-data mark invalidating all data that is stored after said modified data;

modifying said storage system to permit update-in-place data modification by prohibiting said storage system from storing an end-of-data mark after data in said storage system that has been modified;

said storage system being a virtual tape storage system;

receiving, within a translation device driver from said file system, said first type of request, said first type of request being a disk drive type of request to access a particular virtual block within a particular virtual disk drive, said first type of request being in a disk drive format;

accessing, by said translation device driver, a translation map and device attributes that are included within said translation device driver;

translating, by said translation device driver utilizing said translation map and said device attributes, said particular virtual block and said particular virtual disk drive into a particular virtual tape drive and a particular virtual tape volume and a particular record within said particular virtual tape volume;

issuing, by said translation device driver, a tape drive locate command to said particular virtual tape drive, said tape drive locate command being in a tape drive format;

executing, by said virtual tape drive, said tape drive locate command to position said particular virtual tape volume that is associated with said particular virtual tape drive and that includes said particular record;

issuing, by said translation device driver, a tape drive access command to said particular virtual tape drive to access said particular record;

executing, by said virtual tape drive, said tape drive access command by accessing said record;

transmitting a response to said access from said particular virtual tape drive to said translation device driver, said response being in said tape drive format;

receiving, within said translation device driver, said response;

converting said response from said tape drive format to said disk drive format; and transmitting said response in said disk drive format to said file system.

11. An apparatus in a data processing system, said apparatus comprising:

a first type of request received from a disk-based file system to access a first type of storage device that permits direct access reads and writes and implements update-in-place data modification wherein individual blocks of data stored in said first type of storage device can be modified individually without invalidating data stored in any other blocks in said first type of storage device;

a translation device driver for translating said first type of request into a second type of request, said second type of request being a request for a second type of storage device;

said second type of storage device operating in append-only mode, said second type of storage device not permitting update-in-place data modification;

said translation device driver forwarding said second type of request to a storage system, said storage system being designed to be said second type of storage device; and said storage system being modified to permit update-in-place data modification.

12. The apparatus according to claim 11, further comprising:

said storage system being a virtual tape system.

13. The apparatus according to claim 12, further comprising:

said virtual tape system including at least one virtual tape volume; and a physical disk drive on which is stored said at least one virtual tape volume.

14. The apparatus according to claim 11, further comprising:

said second type of storage device operating in append-only mode by storing an end-of-data mark after data in said second type of storage device that has been modified, said end-of-data mark invalidating all data that is stored after said modified data; and said storage system being modified to permit update-in-place data modification by prohibiting said storage system from storing an end-of-data mark after data in said storage system that has been modified.

15. The apparatus according to claim 11, further comprising:

said translation device driver receiving said first type of request, said first type of request being a disk drive type of request to access a disk drive; and said translation device driver translating said first type of request into said second type of request, said second type of request being a request to access a tape drive.

16. The apparatus according to claim 11, further-comprising:

said storage system being a virtual tape system;

said translation device driver receiving said first type of request, said first type of request being a disk drive type of request to access a particular virtual block within a particular virtual disk drive, said first type of request being in a disk drive format;

said translation device driver accessing a translation map and device attributes; and said translation device driver utilizing said translation map and said device attributes to translate said particular virtual block and said particular virtual disk drive into a particular virtual tape drive and a particular virtual tape volume and a particular record within said particular virtual tape volume.

17. The apparatus according to claim 16, further comprising:

said translation device driver issuing a tape drive locate command to said particular virtual tape drive; and said virtual tape drive executing said tape drive locate command to position said particular virtual tape volume that is associated with said particular virtual tape drive and said particular record.

18. The apparatus according to claim 17, further comprising:
by said translation device driver issuing a tape drive access command to said particular virtual tape drive to access said particular record;
said virtual tape drive executing said tape drive access command by accessing said record; and
said particular virtual tape drive transmitting a response to said access to said translation device driver, said response being in a tape drive format.

19. The apparatus according to claim 18, further comprising:
said translation device driver receiving said response;
said translation device driver converting said response from said tape drive format to said disk drive format;
said translation device driver transmitting said response in said disk drive format.

20. The apparatus according to claim 11, further comprising:
said second type of storage device operating in append-only mode by storing an end-of-data mark after data in said second type of storage device that has been modified, said end-of-data mark invalidating all data that is stored after said modified data;
said storage system being modified to permit update-in-place data modification by prohibiting said storage system from storing an end-of-data mark after data in said storage system that has been modified;
said storage system being a virtual tape storage system;
said translation device driver receiving from said file system said first type of request, said first type of request being a disk drive type of request to access a particular virtual block within a particular virtual disk drive, said first type of request being in a disk drive format;
said translation device driver accessing a translation map and device attributes that are included within said translation device driver;
said translation device driver utilizing said translation map and said device attributes to translate said particular virtual block and said particular virtual disk drive into a particular virtual tape drive and a particular virtual tape volume and a particular record within said particular virtual tape volume;
said translation device driver issuing a tape drive locate command to said particular virtual tape drive, said tape drive locate command being in a tape drive format;
said virtual tape drive executing said tape drive locate command to position said particular virtual tape volume that is associated with said particular virtual tape drive and that includes said particular record;
said translation device driver issuing a tape drive access command to said particular virtual tape drive to access said particular record;
said virtual tape drive executing said tape drive access command by accessing said record;
said particular virtual tape drive transmitting a response to said access to said translation device driver, said response being in said tape drive format;
said translation device driver receiving said response;
said translation device driver converting said response from said tape drive format to said disk drive format; and
said translation device driver transmitting said response in said disk drive format to said file system.

* * * * *